Aug. 17, 1954  R. J. ANDRUS  2,686,400
REGENERATIVE LIQUID FUEL ROCKET MOTOR
Filed July 12, 1948  3 Sheets-Sheet 1
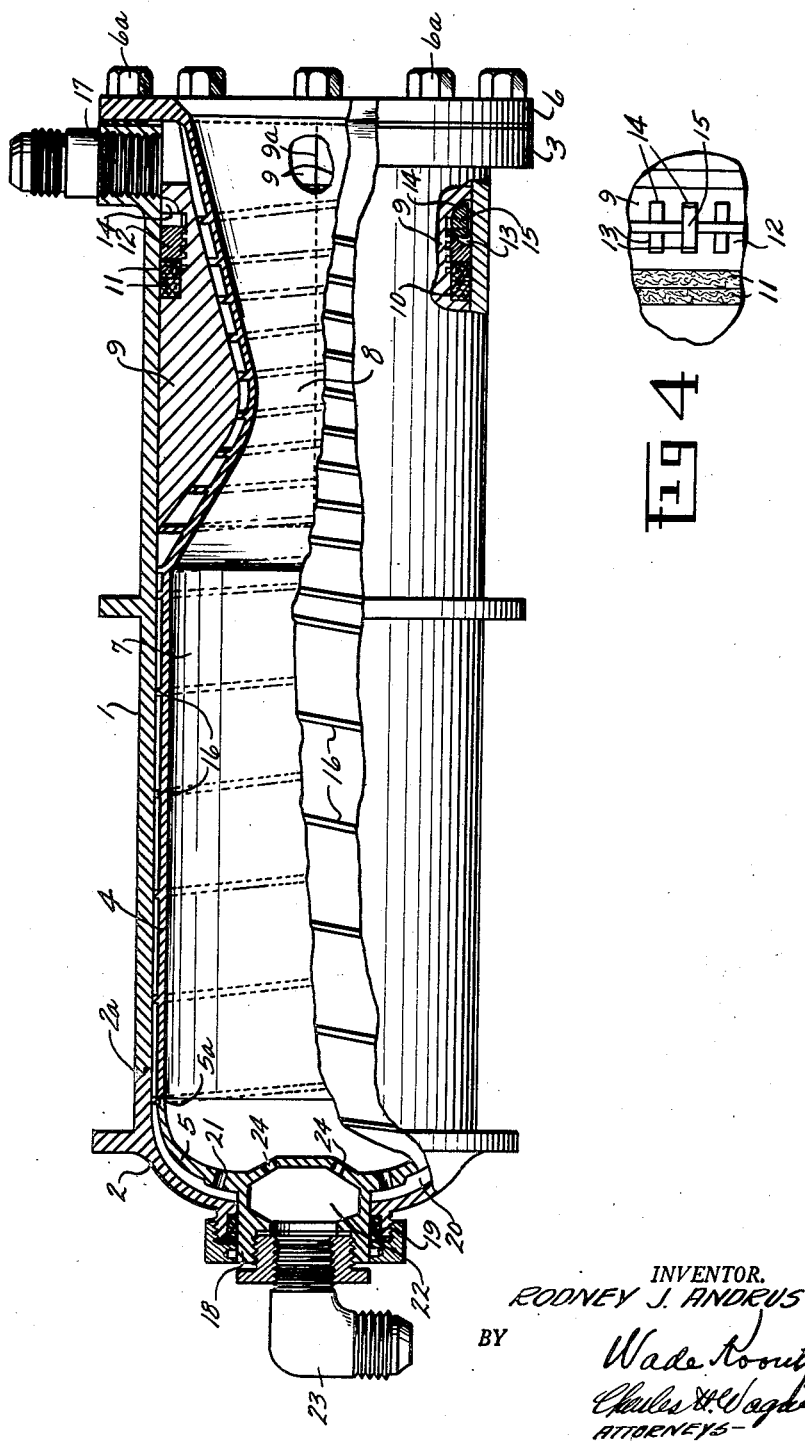
INVENTOR.
RODNEY J. ANDRUS
BY
Wade Koontz
Charles H. Wagner
ATTORNEYS

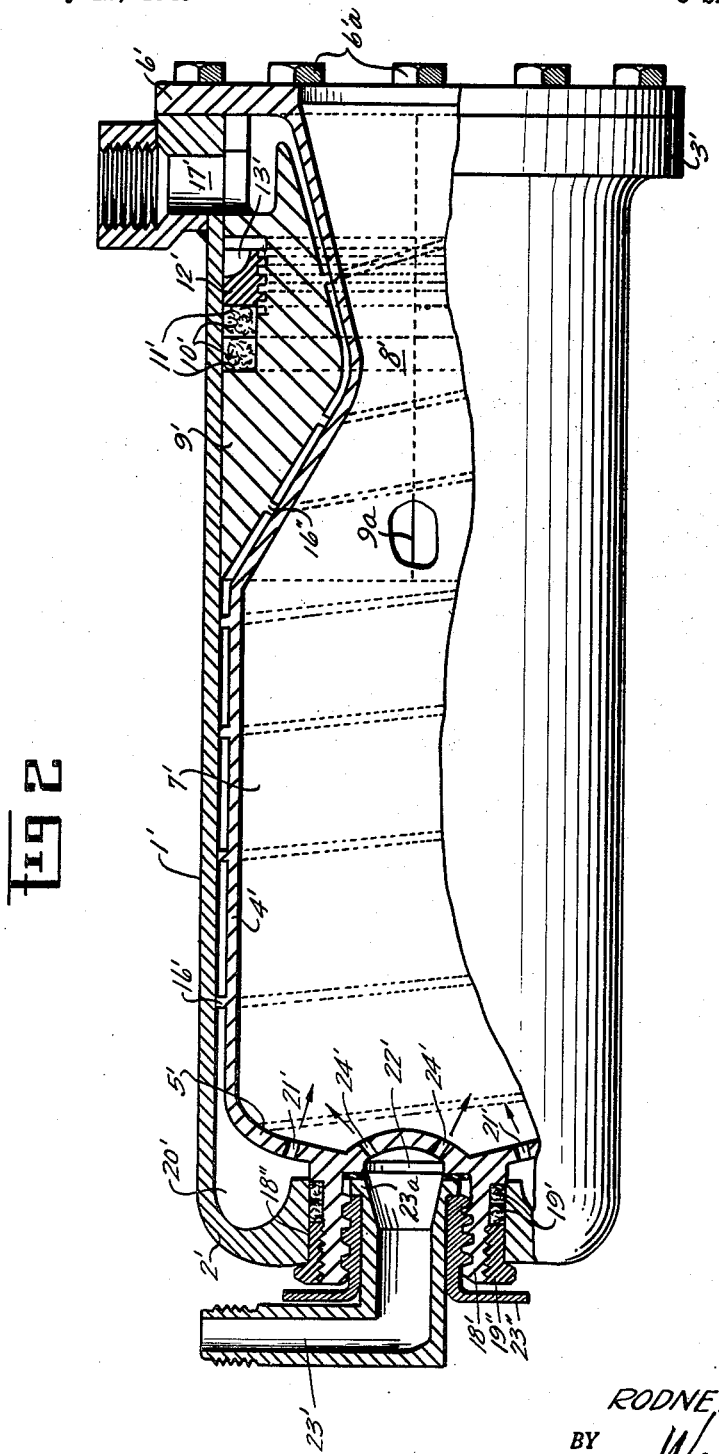

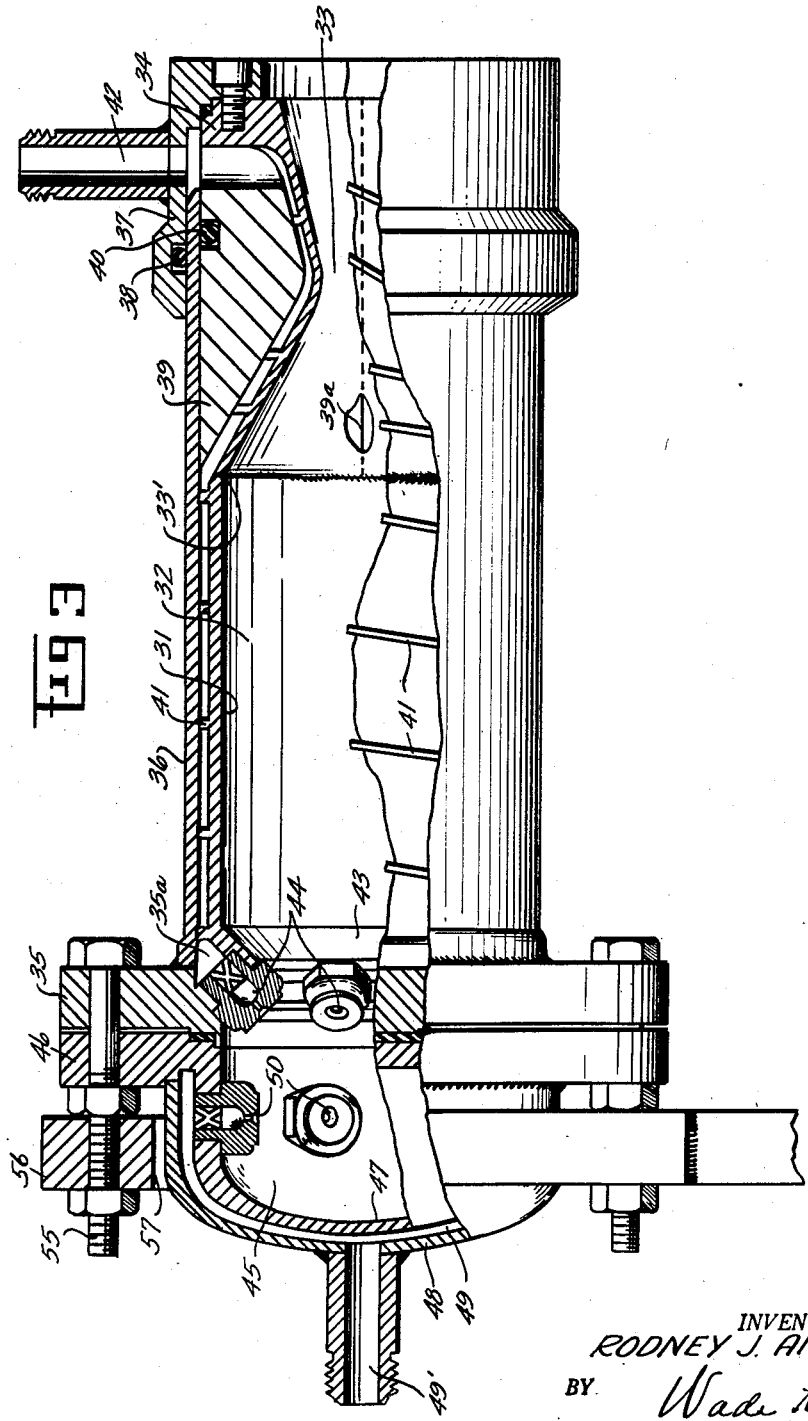

Patented Aug. 17, 1954

2,686,400

UNITED STATES PATENT OFFICE 2,686,400

REGENERATIVE LIQUID FUEL ROCKET MOTOR

Rodney J. Andrus, Berkeley, Calif., assignor to the United States of America as represented by the Secretary of the Air Force Application July 12, 1948, Serial No. 38,315

4 Claims. (Cl. 60—35.6)

1

The invention described herein may be manufactured and used by or for the Government for governmental purposes without payment to me of any royalty thereon.

This invention relates to rocket motors, more particularly to rocket motor propulsion devices utilizing liquid fuel propellants and oxidizers, having for one of its objects the provision of improved liquid propellant and coolant circulation means for controlling the temperature of the walls of the combustion chamber and heating the liquid propellant before it is burned therein.

A still further object is the provision in a rocket motor having an inner shell formed with a combustion chamber having a constricted discharge nozzle, of a helically arranged supporting means on the exterior of the inner shell extending from end to end to space and support an outer shell thereon with the inner wall of the outer shell in contact with the helical supporting means throughout its length, and means for rigidly connecting the inner shell to the outer shell at the discharge end of the discharge nozzle to secure the open ends of the shells together, and including slidable expansion joint means at the other ends of the shells for supporting the inner shell concentrically within the outer shell for relative axial expansion movement therebetween.

Another object of the invention is the provision in a rocket motor having an inner shell formed with a tubular combustion chamber and an integral constricted discharge nozzle extending rearwardly therefrom, of helically arranged supporting, reinforcing and heat dissipating means on the outer surface of the inner shell, extending from the discharge nozzle at the rear end to the front end of the combustion chamber, and tubular supporting means disposed around the exterior of the constricted nozzle portion in spaced relation thereto, with the helical supporting means slidable disposed in supporting contact with the interior of the tubular supporting means and the interior of an outer enclosing shell, and including slidable packing and liquid sealing means between the tubular supporting means and the interior of the outer shell, whereby a liquid coolant fuel or propellant may be introduced between the outer shell and inner shell adjacent the rear end of the discharge nozzle of the inner shell and circulated helically around the discharge nozzle and combustion chamber to the front end of the combustion chamber to cool the same, having means for introducing the coolant in a heated condition into the combustion chamber at its forward end.

2

Other objects and advantages of the invention will become apparent from the following description, taken in connection with the accompanying drawings, in which like reference characters refer to like parts in the several figures.

Fig. 1 is a side elevation of one form of my improved rocket motor construction, a portion of the inner and outer shell being broken away and shown in section.

Fig. 2 is a side elevation, partly broken away and shown in section, of a slightly modified form of my improved rocket motor.

Fig. 3 is a side elevation, partly broken away and shown in section, of the further modified embodiment of my invention.

Fig. 4 is a fragmentary detail view of the locking key member and cooperating notches in the channel and slots in the follower ring.

Referring more particularly to Fig. 1 of the drawings the reference numeral 1 indicates the hollow cylindrical outer shell of a liquid propellant rocket motor, closed at its forward end by a rounded head 2, welded thereon at 2a. The rear end of the outer shell 1 is open and formed with an external flange 3. An inner shell 4 is disposed within the outer shell 1 in spaced relation thereto and provided with a rounded head portion 5 welded thereto at 5a, the exterior curvature of the head 5 following the approximate interior curvature of the head 2. The rear or discharge end of the inner shell 4 has an outwardly extending flange 6 formed thereon which overlies the rear face of the external flange 3 of the outer shell 1 and the inner and outer shells are secured together by the flanges 3 and 6 through suitable fastenings such as the studs or bolts 6a, 6a as shown in the drawing. The inner shell 4 includes a combustion chamber 7 having a constricted discharge nozzle portion 8 extending rearwardly therefrom with the annular flange 6 formed on the shell 4 at the rear end of this discharge nozzle 8. The constricted portion of the discharge nozzle 8 is surrounded by a longitudinally split, as indicated by dotted line 9a, tubular supporting member or filler block 9, guidingly supported by the interior surface of the outer shell as clearly seen in the drawings. The two half sections of the filler block 9 may preferably be secured together by any suitable means (not shown), and is formed with an external annular channel 10, in which suitable liquid sealing packing ring means 11 is disposed. A follower ring 12 is suitably threaded on the exterior threaded portion of the filler block 9, and is rotatable to expand the packing 11. This follower ring 12 may be also split longitudinally so that it can be easily slipped over the filler block 9 and secured together in the channel 10 in engagement with the threaded portion of the filler block 9. The follower ring 12 may be provided with radial wrench slots 13 around its periphery and suitably conforming complemental radial locking notches 14 may be provided in the channel 10 opposite the slots for inserting the opposite ends of a locking key 15 in the notches 13 and wrench slots 14 to lock the ring 12 against rotation on the filler block 9, as shown in Fig. 4.

The packing 11 is preferably expanded into sealing engagement with the interior surface of the outer shell 1 before the inner shell is forced its full distance into the outer shell. The packing 11 is compressed by first introducing the inner shell 4 into the outer shell 1 sufficiently to bring the packing 11 within the confines of the interior of the outer shell without covering the wrench slots 13, the packing 11 being held in place by the outer shell, the ring 12 being rotated in the correct direction to compress the packing 11 against the interior of the outer shell. After the packing 11 has been compressed the locking key 15 is inserted with the opposite ends in one of the registering notches 14 and wrench slots 13 and the inner shell 4 is then forced into the outer shell 1 to its fullest extent, to the position shown in Fig. 1 of the drawings.

The outer surface of the inner shell 4 is provided with one or more spiral or helical webs or ribs 16 which extend from the discharge nozzle end of the inner shell along the entire length of the discharge nozzle and the combustion chamber in conformity therewith and terminate at the head portion 5. At the discharge end of the outer shell 1 of the motor an intake port and fitting 17 is provided for supplying a liquid coolant, preferably a propellant component, between the inner and outer shells 4 and 1, especially to the walls of the inner shell and direct this liquid coolant helically around the discharge nozzle and the combustion chamber to the forward end of the inner shell.

A hollow stem member 18 is formed on the forward end of the inner shell 4 on its rounded head or closure 5 and projects through the head of the outer shell, a slidably sealing connection therebetween being provided by a packing gland 19, permitting relative axial expansive movement between the inner and outer shells 2. The space between the heads 2 and 5 of the shells 1 and 4 defines a liquid fuel injection chamber 20 having a plurality of fuel injection ports 21 directed into the combustion chamber 7. The hollow stem 18 is formed with a central injection chamber 22 into which a suitable fitting 23 is secured for introducing a second propellant component into the chamber 22, such as a liquid oxidizer, complementary to the component circulated between the walls of the shells 1 and 4. The injection chamber 22 is provided with a concentric ring of inlet ports 24, so positioned that the streams of the fuel and the oxidizer issuing from the ports 21 and 24 impinge each other.

The outer or peripheral portion of the helical web or rib 16 is disposed to rest against the interior of the outer shell throughout the major portion of its length and the portion of the helical web extending around the discharge nozzle is disposed in contact with the filler block 9 so as to support the inner shell 4 and discharge nozzle 8 throughout its entire length, providing a heat exchanging rib which constitutes the wall of a helical fluid circulation passage whereby the liquid coolant and propellant fuel component is directed helically around the inner shell, effecting a satisfactory cooling of the inner shell and heating of the coolant liquid before it enters the injection chamber 20, and is introduced in the combustion chamber 7 with the other or oxidizer liquid.

The packing gland 19 permits relative expansion and axial movement of the inner shell 4 with respect to the outer shell 1, the packing 11 around the filler block 9 allowing the filler block to move axially within the outer shell to accommodate the axial movement of the nozzle 8 relative to the outer shell 1, due to expansion or contraction, while preventing the flow of the coolant liquid between the filler block 9 and the interior of the outer shell 1.

The spirally arranged rib on the exterior of the inner shell 4 makes it possible to form this shell with a somewhat thinner wall section, the helical rib also constituting helical reinforcing means for the combustion chamber and for supporting the entire shell in concentrically spaced relation to the outer shell and to the filler block, effecting a heat transfer from the combustion chamber 7 and discharge nozzle 8 to the helical rib 16, this heat being satisfactorily dissipated by the rapid helical circulation of the coolant fuel from the intake fitting 17 to the injection chamber 20. This coolant fuel is correspondingly heated by the exterior of the combustion chamber 7 to produce better combustion as it enters the combustion chamber 7 and is mixed with the oxidizer for component fuel.

Referring to Fig. 2 the outer shell is indicated at 1' having a head 2' and an external flange 3'. The inner shell 4' is formed with a head 5' at one end and a supporting flange 6' at the other end secured in position by suitable fasteners such as studs or bolts 6'a. The inner shell is formed with an elongated combustion chamber 7' having a restricted discharge nozzle 8' extending rearwardly therefrom and surrounded by a longitudinally split tubular follower block or ring 9' somewhat similar to the construction shown in Fig. 1. The follower ring 9' is provided with the annular channel 10' in which a packing ring gland or seal 11' is disposed. The threaded follower ring 12' is preferably provided with radial wrench slots 13' for tool engagement in tightening the ring 12' to expand the packing 10' into engagement with the interior of the outer shell as explained in connection with Fig. 1. In this form of the invention the helical fluid circulating and cooling web or rib is indicated at 16' and projects from the outer surface of the combustion chamber portion of the inner shell, extending from a point near the forward end of the discharge nozzle 8' to the head of the combustion chamber 7'. The tubular filler block 9', split longitudinally as at 9a', is provided as in the construction in Fig. 1, but with a helical rib 16" which extends helically in the same direction as the helical rib 16' projecting from the outer surface of the combustion chamber, to provide a continuous helical fluid conduit with the helical rib 16", around the exterior discharge nozzle 8' and the combustion chamber 7', from the coolant and propellant intake port 17' at the rear end of the motor to an injection chamber 20' at the forward end.

The forward end of the inner sleeve 4' is formed with a tubular supporting extension 18', slidably received in a guide opening 18", formed in the forward end of the outer shell 1'. A somewhat enlarged injection chamber 20' formed in the forward end of the outer shell 1' as shown in the drawings, is provided with fluid injection ports 21' in its rear wall leading therefrom into the forward end of the combustion chamber 7'. The hollow stem 18' is likewise formed with an enlarged component propellant or oxidizer receiving chamber 22' for receiving the component fuel or oxidizer delivered from a suitably supply fitting 23', injection of the component fuel being made into the combustion chamber 7' through injection ports 24' which are disposed, with respect to ports 21', so that the streams of the fuel and the oxidizer from the chambers 20' and 22' are directed rearwardly and towards each other in the combustion chamber 7', as shown by the arrows in the drawings. A packing gland 19' is seated in an annular channel formed in the tubular extension 18', a suitable packing nut 19'' being provided and threaded on the end of the tubular extension 18' as shown in Fig. 2 of the drawings, so as to expand the packing 19'. The fitting 23' is secured in place in a threaded tubular bore formed in the hollow stem 18' by a threaded locking sleeve or collar 23'' which engages a flanged end 23a formed on the inner end of the fitting 23' as shown in Fig. 2.

The coolant and propellant liquid is introduced between the inner and outer sleeves 4' and 1' at the rear end of the outer sleeve through the intake port 17' and is conducted helically around the discharge nozzle 8' and the combustion chamber 7' by the helical rib portions 16'' and 16', effecting a heat transfer between the liquid and the outer surface of the discharge nozzle 8' and the combustion chamber 7', the coolant fuel being delivered into the injection chamber 20' in a heated condition is then injected through the ports 21' into the front end of the combustion chamber 7' and is burned, combustion being supported by the oxidizer or other component propellant liquid that is introduced through the fitting 23' and injected into the combustion chamber 7' through the ports 24'. The helical arrangement of the supporting rib or web 16' provides excellent heat transfer means and also supports and reinforces the inner sleeve 4' concentrically within the outer sleeve 1' throughout its length. The tubular extension 18' with its liquid sealing packing gland 19' maintains the forward end of the inner sleeve 4' concentric within the outer sleeve 1' and permits relative axial expansion between the forward portions of the inner and outer sleeves 4' and 1' without leakage.

In Fig. 3 a somewhat different arrangement is provided although the helical reinforcing rib and coolant fuel circulation conduit means between the inner and outer shells is somewhat similar to the other forms of my invention as described in conjunction with Figures 1 and 2, provisions also being made for expansion between the inner and outer shell members and the prevention of leakage of the helically circulated coolant fuel at the points of expansion. The inner cylindrical shell member is indicated at 31 having a combustion chamber 32, with a discharge nozzle 33 welded to the rear end of the inner shell at 33'. The rear end of the discharge nozzle 33 is provided with an annular flange 34, and the forward end of the inner shell 31 is provided with an annular supporting plate or flange 35 integrally secured thereto by welding. The outer cylindrical shell 36 is welded or otherwise secured to the annular plate or flange 35 to secure the inner and outer shells 31 and 36 together on this plate or flange.

Bolted and sealed to the rear flange 34 of the discharge nozzle is a tubular counter-bored collar 37 extending forwardly in telescopic relation to the rear end of the outer shell 36. An O-ring or suitable sealing gasket 38 is seated in an annular internal channel in the collar 37 and seals the space between the exterior of the outer shell 36 and the internal bore of the collar 37. The space between the outer shell 36 and the exterior of the constricted discharge nozzle 33 contains a tubular filler block or supporting ring 39 which is split longitudinally as indicated at 39a for assembly purposes and may be suitably secured together similar to the filler block 9 or 9' described in connection with the form of my invention illustrated in Figs. 1 and 2. An O-ring or packing 40 is seated in an annular channel in the filler block 39, sealing the space between the interior of outer shell 36 and the exterior of the filler block 39, permitting the inner shell 31 and its nozzle 33 to expand and move axially together with the filler block 39, relative to the outer shell 36. The outer surface of the inner shell 31 is provided with one or more helical ribs or webs 41 which follow the outer contour of the discharge nozzle 33 and the outer surface of the walls of the combustion chamber 32, extending between the flanges 34 and 35. The rib 41 provides a helical conduit or passage from the rear end of the outer shell 36 to the forward end of the inner shell 31, between the shells. An inlet port and fitting 42 is provided connecting the space between the shells, for introducing a coolant fuel into the helical conduit formed by the helical web 41. Adjacent the forward flange 35 the conduit between the helical rib 41 communicates with an annular chamber 35a having outlet ports or nozzles 44 secured in an annular rib 43, in the forwardly diverging conical face thereof.

The forward end of the motor is closed by a head 45 having an integral flange 46 which is bolted to the flange 35. The head 45 is provided with conforming spaced inner and outer walls 47 and 48, defining between them a collection chamber 49. Suitable injection nozzles 50 are mounted in the head 45 in communication with the collection chamber 49 to direct the propellant component or oxidizer introduced through the fitting 49', into streams or jets which impinge the streams or jets of the component propellant issuing from the injection nozzles 44.

In this form of the invention the two propellants or the propellant and the oxidizer are conducted around the exterior of the inner shell between the same and the outer shell from their respective inlet fittings 42 and 49' at least one of the propellants being conducted helically around the combustion chamber of the inner shell from its discharge nozzle toward the flange portion 35—46. The flange or annular plate members 35 and 46 constitute a rigid support for the rocket motor. Elongated securing bolts 55 may be provided as shown, so as to provide bolt fastening means passing through the flanges and a supporting frame 56 which is apertured at 57 to receive the mixing and combustion chamber head 48 therethrough. Expansion between the inner and outer shells is provided, without leakage, by the telescopic collar 37 and the ring sealing gaskets 38 therein.

I claim:

1. In a rocket motor, inner and outer spaced concentric cylindrical shells closed at their forward ends and open at their rear ends, flanged sealing means on the inner and outer shells at their rear ends securing the shells rigidly together in concentric relation to close the space between the inner and outer shells, said inner shell having a relatively thin wall between its ends defining an elongated combustion chamber and a constricted discharge nozzle extending rearwardly therefrom through the outer shell, a helical rib formed integrally on the exterior of the inner shell with its convolutions surrounding said combustion chamber and constricted discharge nozzle with the outer edge of the rib in contiguous relation to the inner surface of the outer shell to reinforce the inner shell throughout the length of the combustion chamber and constricted discharge nozzle and provide a helical liquid coolant fuel conducting passage between the shells and around the constricted discharge nozzle and the combustion chamber from the rear end of the discharge nozzle to the forward end of the combustion chamber, means for introducing a coolant liquid fuel between the shells at the flanged ends of the shells, coolant liquid fuel inlet means through the forward end of the combustion chamber in communication with the space between the shells forwardly of the forward end of the helical rib, a concentrically disposed tubular extension projecting forwardly from the forward end of the combustion chamber, through the forward end of the outer shell, said outer shell having an end wall closure at its forward end formed with a concentric guide opening therein slidably receiving and concentrically supporting the inner shell within the outer shell at its forward end for relative expansive movement between the shells, said tubular extension having a conduit therethrough in communication with the interior of the combustion chamber for introducing a liquid fuel oxidizer component, through said extension into the forward end of the combustion chamber to support the combustion of the liquid coolant fuel within the combustion chamber, and annular liquid sealing means between the tubular extension and the guide opening to seal the space between the tubular extension and the guide opening.

2. In a rocket propulsion motor, an outer cylindrical shell, an inner shell concentrically disposed within the outer shell in spaced relation thereto and formed with a combustion chamber having a rearwardly diverging constricted discharge nozzle, an integral helical rib extending substantially continuously around the exterior of the inner shell from a point adjacent the discharge end of the discharge nozzle to the head of the combustion chamber, an end wall closure for the forward end of the outer shell having a central guide opening therethrough, an axial extension extending forwardly from the inner shell through the guide opening in contiguous slidable relation thereto, liquid sealing means between said extension and said guide opening to provide for relative axial expansion between the inner and outer shells, liquid fuel conducting and delivery means between the space between the inner and outer shells at their forward end and the interior of the combustion chamber, conduit means between the exterior of the outer shell and the space between the inner and outer shells at their rear ends for introducing a liquid coolant fuel thereinto, for delivery to the interior of the combustion chamber through the liquid fuel conducting means, reinforcing filler block means surrounding the constricted portion of said discharge nozzle in contiguous relation to the portion of the outer edge of said helical rib surrounding said discharge nozzle, and slidably disposed within the outer shell in contiguous relation to its inner surface.

3. In a rocket motor, inner and outer concentrically spaced cylindrical shells of relatively thin cross section having their rear ends open, and their forward ends closed and spaced to form a first fluid collection chamber therebetween, said inner shell having an elongated cylindrical combustion chamber formed therein with a constricted discharge nozzle extending therefrom through the outer shell and a closed second fluid collection chamber at its forward end in communication with the interior of the combustion chamber; a helical rib integrally formed on the exterior of the inner shell through its length with the convolutions of the rib encircling said combustion chamber and discharge nozzle without interruptions therein, with the outer edge of the rib in contiguous relation to the interior of the outer shell throughout the length of the combustion chamber; a tubular filler block having a constricted bore therethrough surrounding the discharge nozzle in contiguous relation to the outer edge of the helical rib throughout the major portions of the length of the discharge nozzle; said filler block having its periphery disposed in contiguous sliding relation to the cylindrical interior of the outer shell; annular laterally projecting overlapping flange means on the rear ends of the inner and outer shells, rigidly securing the shells together at their rear ends and closing the space between the rear ends of the inner and outer shells; said inner shell having openings therethrough at its forward end surrounding the second fluid collection chamber in communication between the first fluid collection chamber and the interior of the combustion chamber; a first propellant supply conduit connected to the first fluid collection chamber at its rear end in communication with the space between the helical ribs; a second propellant supply conduit connected to the second propellant supply chamber and extending forwardly through the forward end of the outer shell and comprising an axially disposed tubular support projecting forwardly from the front end of the inner shell; said outer shell having a guide opening in its front end to slidably receive the tubular support therethrough; and fluid tight packing means between the surrounding guide opening and the tubular support in sealing engagement with the tubular support to prevent leakage between the guide opening and the tubular support.

4. Apparatus as claimed in claim 2, including annular liquid sealing means between the exterior of the reinforcing filler block means and the interior of the outer shell, in which said axial extension is cylindrical and projects axially through the central guide opening formed in the closed end of the outer shell.

References Cited in the file of this patent

UNITED STATES PATENTS

| Number | Name | Date |
|---|---|---|
| 1,879,186 | Goddard | Sept. 27, 1932 |
| 2,500,334 | Zucrow | Mar. 14, 1950 |

OTHER REFERENCES

"Astronautics" for March 1936, pages 12, 13 and 18.

"Rocketry" by C. P. Lent, published by Pen-Ink Pub. Co., 130 W. 42nd Street, New York, N. Y., 1947, page 54.